March 14, 1967  R. M. DAHL  3,308,782
AMPHIBIOUS VEHICLE
Filed April 5, 1965  2 Sheets-Sheet 1
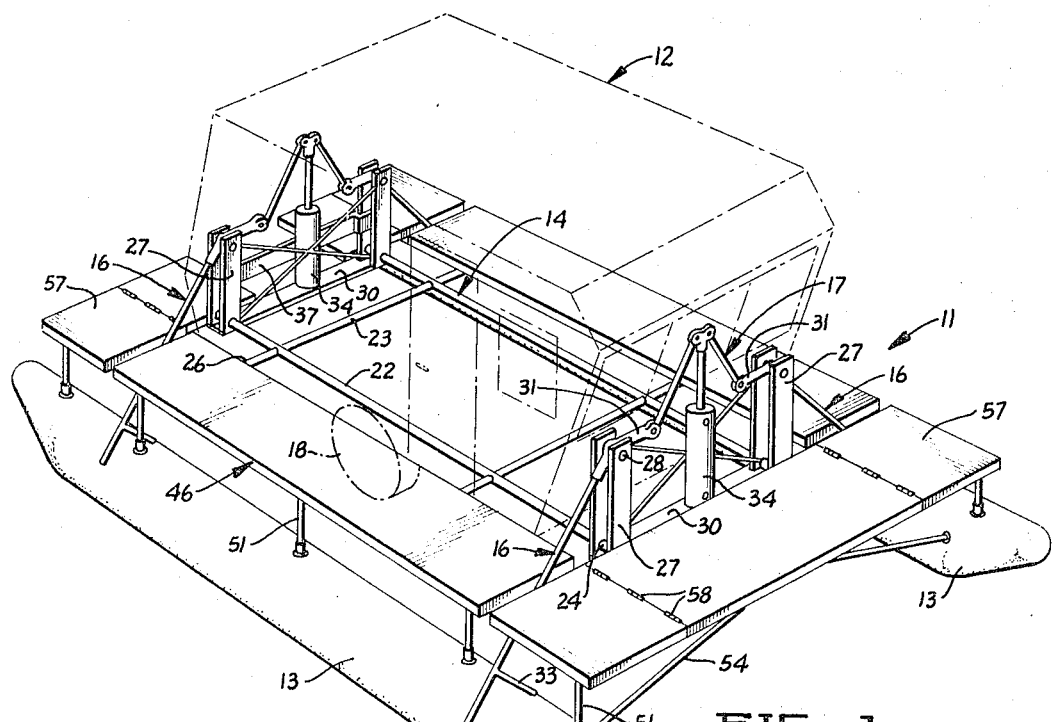
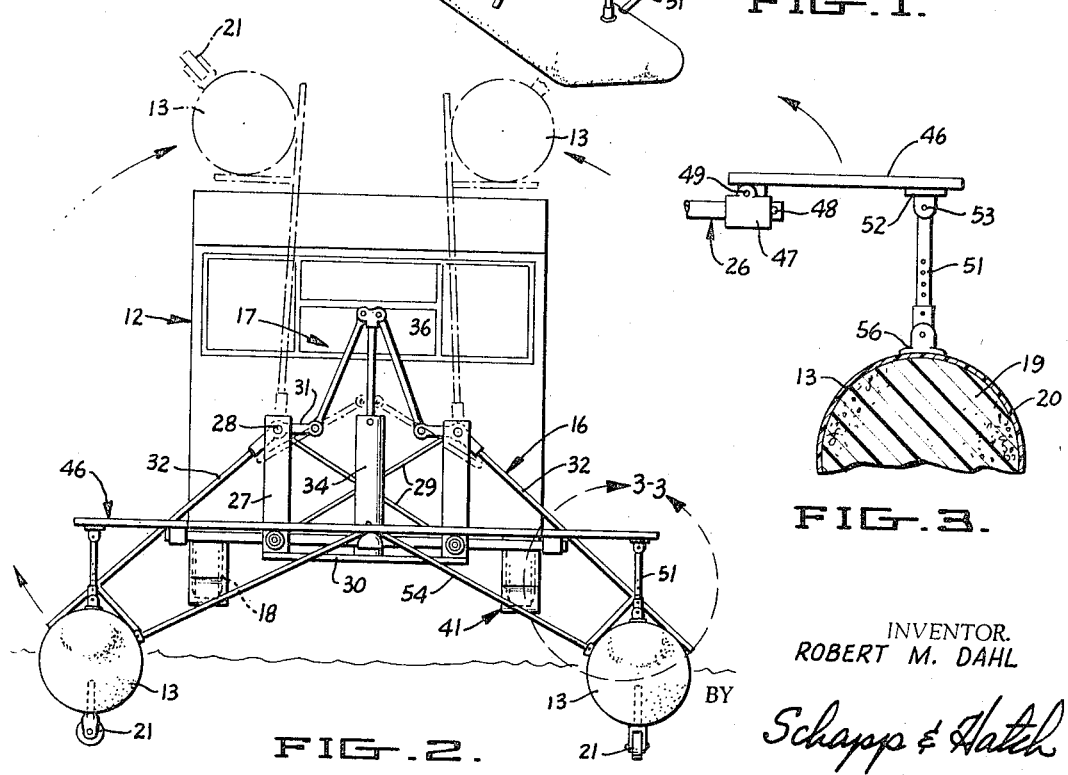
INVENTOR.
ROBERT M. DAHL
BY
Schapp & Hatch
ATTORNEYS

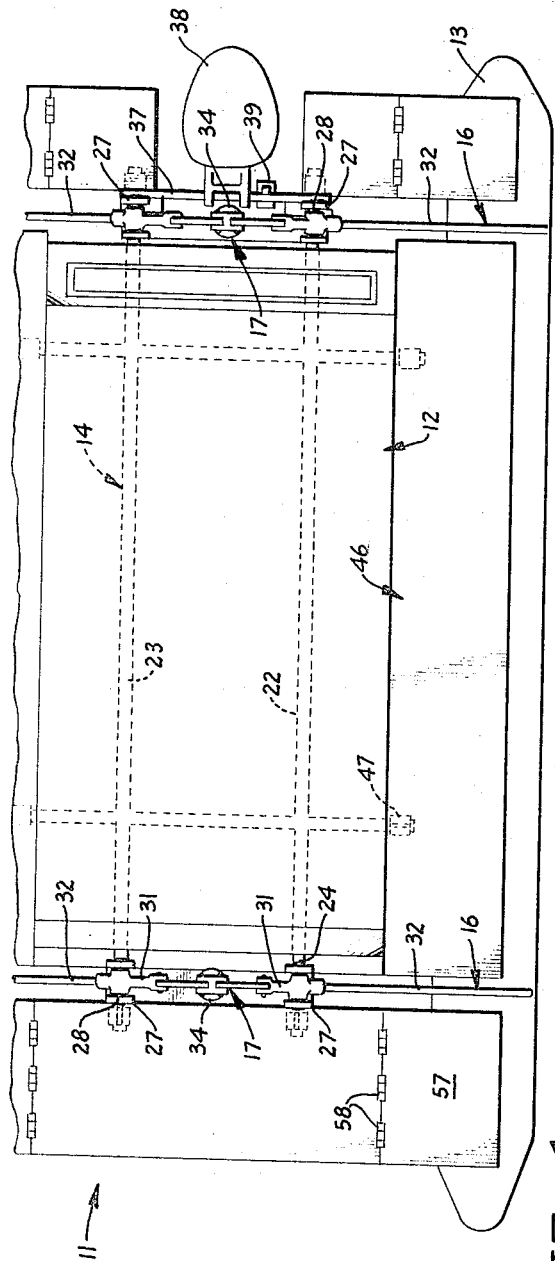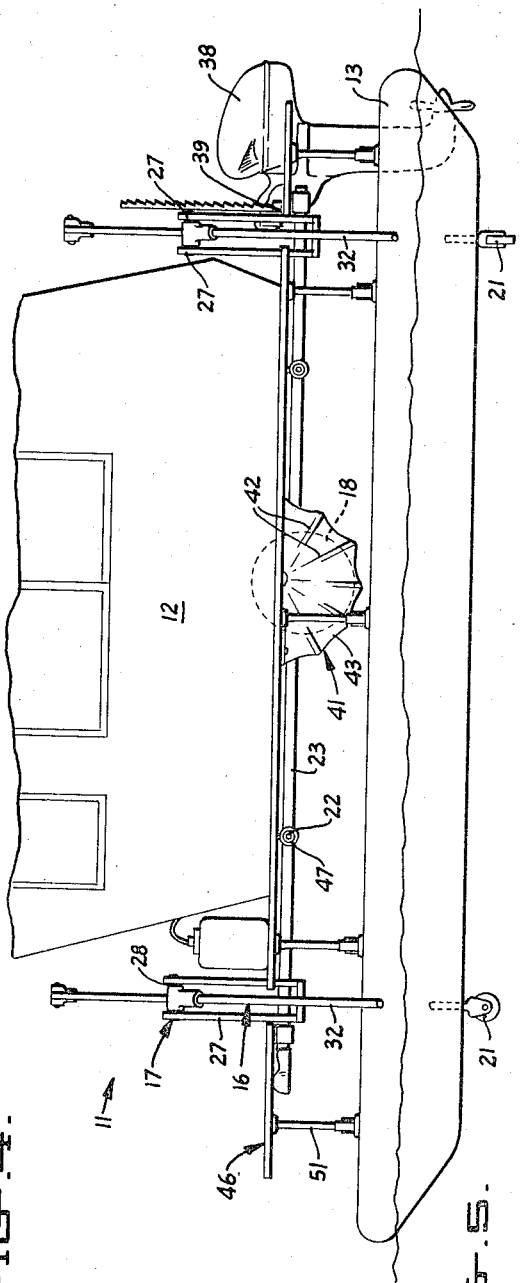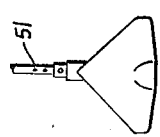

United States Patent Office 3,308,782
Patented Mar. 14, 1967

3,308,782
AMPHIBIOUS VEHICLE
Robert M. Dahl, 42 Diablo View Road,
Pleasant Hill, Calif. 94523
Filed Apr. 5, 1965, Ser. No. 445,489
6 Claims. (Cl. 115—1)

The present invention relates to improvements in an amphibious vehicle, and particularly to a vehicle, such as a house trailer or the like, which is adapted to be converted from road travel to water travel by means of pontoons.

The upsurge in outdoor recreation has produced an accompanying demand for versatile shelter and travel devices, among such devices being a practical and economical vehicle combining the advantages of the house trailer and the house boat. Such a vehicle would retain the relative ease of road travel afforded by a house trailer and yet convert easily and rapidly to safe water travel. Thus the user would have ideal flexibility in his choice of land or water travel and of location of his shelter, either ashore or afloat.

For reasons of flexibility and economy, such an amphibious vehicle may take the form provided by applicant, that of fairly simple gear detachably mounted on a conventional house trailer, camper, or other wheeled vehicle.

Amphibious use of a conventional house trailer, camper or the like presents a number of problems, however, as such commercial units are not usually designed to withstand prolonged water immersion. For one thing, conventional wheel bearings are substantially deteriorated by extended immersion in water, and special bearings designed to withstand such immersion are expensive. Furthermore, brake systems are usually installed on house trailers and the pickup trucks which support campers, and they too are vulnerable to water damage, as are the lights and other running gear. Finally, commercial house trailers and pickup trucks are seldom constructed with water-tight, seaworthy shells, so that if the body of the trailer or truck were to be immersed in or unduly exposed to water, modification would have to be made to it to seal it against water intrusion.

All of the foregoing problems are solved in applicant's invention by providing a vehicle in which the entire trailer, et cetera, including wheels, is lifted out of the water when afloat. To lift the trailer in this fashion, the pontoons extend lower than the wheels of the house trailer when the pontoons are in their lowered "in use" position. Moving the pontoons into such a position requires that the entire house trailer be lifted vertically with respect to the pontoons. To accomplish this, applicant has provided a mechanism capable of moving the pontoons between their raised "stored" and their lowered "in use" positions, and also capable of lifting the weight of the house trailer so it is supported on the pontoons when the latter are in their lowered "in use" position. This mechanism affords rapid and easy movement of the pontoons for converting the vehicle from land to water travel.

The mechanism for moving the pontoons is preferably a power multiplying apparatus of some sort, as the pontoons contact the ground or are afloat before reaching their fully lowered position, and their subsequent movement to their fully lowered position must lift the entire weight of the house trailer. As shown in the preferred embodiment of applicant's invention, power is supplied to the mechanism by an hydraulic cylinder. Use of hydraulic power gains several advantages, including simplicity of structure, ease and rapidity of operation, and the ease with which power may be simultaneously applied to hydraulic units powering the linkage at either end of the trailer. It must be appreciated that other power means such as hand-powered screw jacks, electric motor gear or cable drives, or ratchet mechanisms may be applied for this purpose as well.

Applicant has constructed his vehicle to permit its amphibious conversion either on land or in shallow water. After conversion on land, the vehicle often must be moved relatively short distances across the land while riding on the pontoons, so applicant has equipped the pontoons for this purpose with casterable wheels. These casterable wheels not only assist in the movement of the vehicle on the ground while riding on the pontoons, but they also enable the pontoons to move laterally with respect to the vehicle along the ground during their movement between the fully elevated and fully lowered positions. Other structures for permitting the movement of the pontoons along the ground, such as skids or large diameter rubber balls, could be used in place of the casterable wheels shown in the preferred embodiment, as well as other structures designed to permit flexibility in direction of movement.

An outboard motor is used to drive applicant's vehicle in the water so the transom-like motor mounting member has been made retractable vertically upward so that the motor may be pulled up to clear the ground surface when the vehicle is converted for land use.

Use of a commercial house trailer in applicant's amphibious fashion imposes static and dynamic loads upon the structure of the house trailer at locations other than those involved in its normal road use. To make possible such amphibious use without requiring custom or unusual design or modification of the commercial house trailer, applicant has provided his amphibious gear with a framework for distributing the static and dynamic loads so that a commercial house trailer may successfully bear them. This framework is securely attached to the house trailer and the remainder of the gear for applicant's amphibious device is attached to the framework in such a fashion that it is both securely held and yet readily demountable so that it can be sold separately from the trailer proper and can also be conveniently removed for road use of the trailer when the amphibious feature is not required.

Even though the house trailer and its wheels are lifted entirely clear of the water then the unit is afloat, the wheels may still receive substantial exposure to the water through splashing. To prevent this, applicant has provided wheel covers which may be extended around the wheels of the house trailer to further protect them from splashing when the unit is afloat.

Accordingly, it is a principal object of the present invention to provide flotation gear adapted for attachment to a conventional house trailer to render the house trailer amphibious in operation.

It is a further principal object of the present invention to provide an amphibious vehicle of the character described in which the house trailer, including its wheels, is lifted clear of the water when the vehicle is afloat.

Another object of the present invention is to provide an amphibious vehicle in which the road traveling wheels are shielded from the splashing action of water when the vehicle is afloat.

A further object of the present invention is to provide an amphibious vehicle having pontoons so constructed that the vehicle may be moved around while it is on land, with the pontoons bearing the full load of the vehicle.

A still further object of the present invention is to provide an amphibious house trailer or the like in which the motor mounting transom is retractable mechanically from a lowered position such that the propeller of the motor is immersed in the water when the vehicle is afloat, to a raised position such that the motor substantially clears the ground surface when the vehicle is on land.

Yet another object of the present invention is to provide an amphibious vehicle of the character described which is capable of moving flotation pontoons from an inactive position above the vehicle to a lowered position at the sides of the vehicle, and which is thereafter capable of lifting the weight of the vehicle onto the pontoons.

It is a still further object of the present invention to provide an amphibious vehicle of economical construction which may easily and rapidly be converted from highway to water use, thus providing the advantages of a house trailer and house boat in a single unit and greatly increasing its utility to the owner.

Further objects and advantages of my invention will appear as the specification proceeds, and the new and useful features of the amphibious vehicle will be fully defined in the claims hereto attached.

The preferred form of my invention is illustrated in the accompanying drawing, forming part of this application, in which:

FIGURE 1 is a perspective view of the apparatus of the present invention showing the conventional house trailer in phantom, with the pontoons in lowered position for water travel.

FIGURE 2, a front elevation of my amphibious house trailer with the pontoons in lowered position for water travel and also shown in phantom in the elevated position for road travel.

FIGURE 3, an enlarged view of the area enclosed by line 3—3 of FIGURE 2, showing the structure of the support members for the decking.

FIGURE 4, a partial top view showing the framework beneath the trailer in phantom.

FIGURE 5, a partial side view showing the unit as it would appear in the water with the pontoons lowered.

FIGURE 6, a partial cross-sectional view of an alternative configuration of the pontoons.

Referring to the drawings in detail, it will be seen that the apparatus 11 of the present invention is attached to a vehicle or house trailer 12 to convert same to amphibious use and includes a pair of pontoons 13, a framework 14 attached to vehicle 12, elongated members or booms 16 which are pivotally mounted on framework 14 and carry pontoons 13 near their outer ends for movement between the elevated position shown in phantom in FIGURE 2 and the lowered position shown in solid in that figure, and actuating means 17 which is mounted on framework 14 and connected to members 16 for the purpose of moving the pontoons between their elevated and lowered positions.

In the preferred form of applicant's invention, as shown in these drawings, vehicle 12 is a conventional house trailer having the usual wheels 18 with which such trailers are equipped.

The pontoons 13 are of elongated form for facility in carrying and maneuvering the amphibious vehicle while in the water. In order to obtain sufficient flotation to support the entire weight of the amphibious vehicle, and to provide longitudinal stability, the pontoons preferably extend a considerable distance ahead of and behind the road unit. The pontoons may be of any suitable cross-sectional shape such as the circular configuration illustrated in FIGURES 1, 2 and 3 of the drawings. However, it has been found that a substantially triangular shape, with the base of the triangle lowermost as shown in FIGURE 6, will result in the pontoons sinking less while supporting a given load, and this may be desirable for simplifying and lightening the booms 16 and actuating means 17. The pontoons 13 are here shown to be constructed of a unicellular foamed plastic material 19 encased in an outer covering 20 of plastic or metal material so that the foamed plastic renders the pontoon puncture-proof and gives it the necessary buoyancy, while the outer skin material 20 strengthens the pontoon and protects its foam plastic material 19 from mechanical damage. Pontoons 13 may be equipped with ground engaging means, shown here as casters 21, on that side of the pontoons 13 which is presented downward when the pontoons are in their fully lowered position.

Framework 14 is shown here as being constructed of longitudinal beams 22 running length-wise of the house trailer and transverse beams 23 running at right angles thereto. Beams 22 and 23 are slightly longer in dimension than the vehicle 12 so that they form short extensions 24 of the longitudinal beams and short extensions 26 of the transverse beams beyond the side walls of vehicle 12. Detachably mounted on extensions 24 are support members or bearing stanchions 27 which extend upwardly therefrom and have bearing means 28 mounted in their upper ends. Reinforcing struts 29 are attached to stanchions 27 to prevent their motion, and a base member 30 is fastened to each pair of stanchions 27 to further strengthen them and to support other parts of applicant's amphibious gear.

Booms 16 are journaled on bearing means 28, with a short extension 31 of the boom projecting beyond the inner side of stanchion 27 to serve as a lever arm for moving boom 16, and a pontoon-carrying arm 32 of boom 16 extending ontwardly from stanchion 27 and carrying pontoon 13 attached near its outer end. A load distributing member 33 is attached to arm 32 near the end of the arm and also to pontoon 13 to more evenly distribute the load of the vehicle upon the pontoon when the pontoon is in the lowered position and to aid in supporting the weight of the pontoon when the pontoon is in the raised position.

In the embodiment shown here, actuating means 17 includes a hydraulic cylinder 34 mounted on base member 30 and linkage 36 connecting the actuating members of cylinders 34 to extensions 31 of booms 16. The hydraulic cylinder 34 and linkage 36 of the actuating means is shown in solid lines in FIGURE 2 in that position in which the pontoons are lowered for water travel and in phantom in FIGURE 2 in that position in which the pontoons are raised for land travel.

A support member or transom 37 is mounted for sliding vertical movement between the rear pair of stanchions 27 for supporting the outboard motor 38 used to drive the vehicle in the water. Motive means 39 is provided for moving this transom and the attached outboard motor 38 between a lowered position in which the motor engages the water and a raised position in which the motor clears the road surface. As shown here, motive means 39 is constructed along the lines of a rack and pawl automobile jack, with the rack attached to base member 30 and the moving member bearing upon support member or transom 37. Other power applying means such as screw jacks or hydraulic cylinders would serve equally well in this function.

The conventional wheels 18 of vehicle 12 are provided with cover means 41 attached to the underside of vehicle 12 for protecting wheels 18 from splashed water during water travel. Cover means 41 here takes the form of retractable wheel covers composed of ribs 42 covered in accordion-fold fashion with waterproof flexible material 43. Ribs 42 are of a generally U-shaped configuration with their ends pivotally mounted to the underside of vehicle 12, one end being on each side of wheel 18, and with the pivoting points lying along an axis parallel to the axis of wheel 18 so that the cover 41 when extended compactly covers wheel 18. The covers 41 may be retained in either folded or extended position by suitable clips or fasteners.

Decking 46 extends around the vehicle 12 and is attached to extensions 24 and 26 of transverse and longitudinal beams 22 and 23 by sleeves 47 which are held in place on extensions 24 and 26 by retaining pins 48. Attached to sleeves 47 are hinges 49 coupling the sleeves 47 to the sections of decking 46. The side and corner sections of decking 46 are supported at their outward ends by vertical support members or struts 51 which are pivotally attached to decking 46 by means of a bracket 52 having a pivot pin 53. The front section of decking 46 which does not have a pontoon for a vertical strut to bear on, is supported by angle struts or support members 54 to the pontoons on either side. Angle struts 54 are attached to the front section of decking 46 in a fashion similar to the attachment of vertical struts 51. Vertical struts 51 and angle struts 54 transmit loads placed on decking 46 to pontoons 13 through bearing shoes 56 bearing on the surface of pontoons 13. Corner sections 57 of decking 46, which are not accessible to extensions 24 and 26, are attached on one side to the front and rear sections of decking 46 by hinges 58.

While I have shown only the preferred form of my invention, it should be understood that various changes or modifications may be made within the scope of the claims hereto attached without departing from the spirit of the invention. For example, the present invention could be used for flotation of a truck of the pickup type with a so-called "camper" body thereon so that the wheels of the pickup truck serve the function of house trailer wheels 18 in the embodiment shown here. Other wheeled vehicles, such as trailers, vans, jeeps, trucks, automobiles, etc. may also be rendered amphibious by the apparatus of the present invention.

In typical operation, framework 14 is attached to vehicle 12 on a relatively permanent basis. It does not project beyond the sides, front and rear of the house trailer to such a degree as to be inconvenient in normal road travel. Thus, the amphibious gear may be completely removed from the house trailer 12 during periods when there is no expectation of its being needed. The apparatus is constructed so that support members 27 are readily removable, and actuating means 17 is likewise readily removable for such extended periods of non-amphibious use. When it is desired to use the vehicle in amphibious fashion, support members 27 are fastened to extensions 24 and actuating means 17 is fastened to framework 14, preferably while the house trailer is on dry land.

For highway travel, the amphibious gear appear as shown in phantom in FIGURE 2. The hydraulic cylinder 34 and its linkage 36 would be in the lowered position shown in phantom in FIGURE 2 and the pontoons 13 would be swung upward on elongated members or booms 16 atop the vehicle. Cover means 41 would be folded back from around wheels 18 and securely clipped in that folded position. Decking 46 would be folded upward on hinges 49 and 58 against the sides, front and rear of the trailer, thus reducing the amphibious apparatus' width to approximately normal road width of the trailer. Struts 51 and 54 would be folded against the outer sides of decking 46 in its upraised position and be retained in folded position by suitable fasteners. With the unit in this folded-up state, it makes a compact, manageable road-traveling package, which may be towed by car or truck from one water body to another.

Upon arrival at water, the trailer 12 may be uncoupled from its towing vehicle near a suitable launching site. Elongated members 16 are then driven downwardly from the position shown in phantom in FIGURE 2 to the position shown in solid in that figure, by applying hydraulic power to cylinders 34, which actuate the linkages 36, swinging members 16 about their bearing means 28. It can be seen that casters 21 will be the first part of the pontoon and boom structure to touch ground. They will then caster around to roll in a direction transverse to house trailer 12 to enable the pontoons 13 to roll slightly inward toward the sides of trailer 12 to their fully lowered position. When the pontoons reach this final, fully lowered position, the entire house trailer 12 has been lifted vertically so that its wheels 18 now clear the ground substantially and the entire apparatus can be rolled along the ground on casters 21. This is essentially the configuration shown in solid in FIGURE 2, only casters 21 are bearing on the ground surface rather than having the apparatus afloat, as shown in that figure.

The vehicle may also be converted to water travel while resting on its road-traveling wheels 18 in shallow water, by swinging pontoons 13 down until their buoyancy lifts the house trailer wheels 18 out of the water.

To further carry out the preparation for water-borne use, decking 46 is folded downwardly from the sides of the trailer 12 and support members or struts 51 and 54 are released and folded outwardly from them to bear on the surface of pontoons 13. The corner sections of decking 57 are folded out from their respective decking sections 46. With the trailer wheels 18 lifted clear of the ground, cover means 41 may be extended around wheels 18 to protect them from water. To do this, ribs 42 are unclipped from their folded-up position and pivoted around their point of attachment to trailer 12, carrying waterproof flexible material 43 with them, to their fully extended position as shown in FIGURE 5. The covers 41 are then secured in this position by suitable fastening means. With these operations complete, the entire unit may be rolled along the ground surface on casters 21 until it is afloat, borne by pontoons 13. Once the unit is afloat, outboard motor 38 may be lowered to operating depth in the water by operation of motive means 39, which in the preferred embodiment of this invention consists of a modified automobile jack bearing on framework 14 and raising or lowering support member or transom 37 with respect to framework 14. It may be seen that, depending on the depth to which the propeller of outboard motor 38 is to be lowered, it would be possible in some cases to lower the outboard motor before launching the amphibious vehicle.

To remove the vehicle from the water, the foregoing operations are essentially repeated in reverse order. The vehicle is brought near a suitable beaching point, outboard motor 38 is raised by motive means 39 to a point where its propeller will clear the ground, and the unit is pulled out of the water, riding on casters 21. Cover means 41 are folded back from around wheels 18 and secured in the folded position by suitable fastening means, and decking sections 46 and 57 are folded up on their hinges 49 and 58 until they are approximately vertical along the sides of the trailer 12. Hydraulic power is then supplied to cylinders 34, actuating linkages 36 in a downward direction, which swings booms 16 outward and upward to a position where the pontoons 13 are again atop house trailer 12, as shown in phantom view in FIGURE 2. In this process, the house trailer 12 has been lowered vertically until its wheels 18 once again bear on the ground surface. Of course, conversion back to land travel may also be made in shallow water by reversing the sequence of operations given above for conversion to water travel while resting on wheels 18 in shallow water. The unit is now ready to be coupled to the towing vehicle for highway travel.

From the foregoing, it will be seen that the present invention provides a novel device for rendering amphibious conventional house trailers and the like, in which the house trailer when afloat is lifted above the water to such an extent that its wheels are out of the water and in which the wheels are shielded from splashed water. The pontoons of the apparatus are adapted to be able to bear and transport the load of the house trailer across land in an easily maneuverable fashion, and are provided with actuating means for moving them between their elevated and lowered positions. It may also be seen that the amphibious vehicle is provided with a retractable motor support member so that the motor may be lowered to engage the water when afloat and raised to clear the ground when on land.

I claim:

1. A device for flotation of house trailers and the like, comprising a pair of pontoons, a framework adapted for attachment to a house trailer, booms carried on said framework for freedom of swinging movement, said pontoons being attached to the distal ends of said booms for movement between an elevated position above the house trailer and a lowered position spaced laterally from and lower than the house trailer, the bottoms of said pontoons being lower than the bottoms of the wheels of the house trailer in said lowered position by a distance sufficient to elevate the bottoms of the house trailer wheels above the water when said pontoons are afloat, said booms being formed and proportioned for lifting and supporting the weight of the house trailer on said pontoons as the latter move toward said lowered position, ground engaging means on said pontoons each of which ground engaging means is formed to provide freedom of lateral movement of the pontoons relative to the ground while the house trailer is being lifted and supported thereon, and actuating means connected to said booms and formed for effecting said swinging movement of said pontoons between said elevated and lowered positions.

2. A device as defined in claim 1, in which said ground engaging means comprise casters mounted in said pontoons for freedom of turning movement about a vertical axis.

3. An amphibious vehicle, comprising a house trailer, a pair of pontoons, a framework attached to said house trailer, booms journaled on said framework for pivotal motion relative thereto, said pontoons being attached to one extremity of each of said booms for movement between an elevated position above said house trailer and a lowered position spaced laterally from and lower than said house trailer, the bottoms of said pontoons being lower than the bottoms of the wheels of the house trailer in said lowered position by a distance sufficient to elevate the bottoms of the house trailer wheels above the water when said pontoons are afloat, said booms being formed and proportioned for lifting and supporting the weight of the house trailer on said pontoons as the latter move toward said lowered position, ground engaging means on said pontoons each of which ground engaging means is formed to provide freedom of lateral movement of the pontoons relative to the ground while the house trailer is being lifted and supported thereon, and actuating means connected to said booms and formed for effecting said swinging movement of said pontoons between said elevated and lowered positions.

4. An amphibious vehicle as described in claim 3, in which the wheels of said house trailer are fitted with retractable wheel covers secured to the underside of said trailer.

5. An amphibious vehicle as described in claim 4, in which said covers comprise a plurality of U-shaped ribs pivotally mounted at their extremities upon said house trailer, and waterproof flexible material covering said ribs in accordion-fold fashion such that when said ribs are extended around said wheel, said ribs and material form a compact protective cover for said wheel.

6. An attachment for house trailers, comprising a pair of pontoons, a framework detachably mounted on said house trailer, said framework having removable support members on opposite sides of said house trailer, bearing means mounted on said support members, elongated members pivotally mounted on said bearing means and carrying said pontoons for movement between an elevated position above said house trailer and a lowered position spaced laterally from and lower than said vehicle, the bottoms of said pontoons being lower than the bottoms of the wheels of the house trailer in said lowered position by a distance sufficient to elevate the bottoms of the house trailer wheels above the water when said pontoons are afloat, said elongated members being formed and proportioned for lifting and supporting the weight of the house trailer on said pontoons as the latter move toward said lowered position, ground engaging means on said pontoons formed to provide freedom of movement of the pontoons relative to the ground while the house trailer is being lifted and supported thereon, said ground engaging means comprising a plurality of casters, a support member adapted for mounting an outboard motor slideably movable in a vertical direction on said framework between lowered and elevated positions whereby an outboard motor attached to said member will be properly positioned for use in water when said member is in said lowered position and will be raised sufficiently to provide adequate road clearance when said member is in said elevated position, motive means for displacing said support member between said raised and lowered positions, cover means attached to the underside of said house trailer and extendable over the wheels of said house trailer for protecting said wheels from splashing water when said house trailer is afloat, said cover means comprising a plurality of U-shaped ribs pivotally mounted at their extremities upon said house trailer and waterproof flexible material carried by and covering said ribs in accordion-fold fashion such that when said ribs are extended around said wheel, said ribs and material form a compact protective cover for said wheel, and actuating means connected to said elongated members and formed for effecting said movement of said pontoons between said elevated and lowered positions, said actuating means including a hydraulic cylinder mounted on said framework and a linkage connecting said hydraulic cylinder to said elongated members for effecting said swinging movement between said elevated and lowered positions.

References Cited by the Examiner

UNITED STATES PATENTS

| 2,928,631 | 3/1960 | Hartman | 115—41 X |
|---|---|---|---|
| 2,994,294 | 8/1961 | Roth | 115—1 |
| 3,026,841 | 3/1962 | Pender | 115—1 |
| 3,211,124 | 10/1965 | Mantle | 115—5 |

FOREIGN PATENTS

| 1,111,048 | 7/1961 | Germany. |
|---|---|---|
| 1,175,607 | 11/1958 | France. |

MILTON BUCHLER, *Primary Examiner.*

ANDREW H. FARRELL, *Examiner.*